US009135792B2

(12) United States Patent
Han et al.

(10) Patent No.: US 9,135,792 B2
(45) Date of Patent: Sep. 15, 2015

(54) SYSTEM AND METHOD GENERATING MOTOR DRIVING SIGNAL AND METHOD CONTROLLING VIBRATION

(71) Applicants: Yun-Cheol Han, Yongin-Si (KR); Ji-Hyun Kim, Hwaseong-Si (KR)

(72) Inventors: Yun-Cheol Han, Yongin-Si (KR); Ji-Hyun Kim, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 200 days.

(21) Appl. No.: 13/891,606

(22) Filed: May 10, 2013

(65) Prior Publication Data

US 2014/0015652 A1 Jan. 16, 2014

(30) Foreign Application Priority Data

Jul. 12, 2012 (KR) ........................ 10-2012-0076211

(51) Int. Cl.

| | |
|---|---|
| ***H04B 3/36*** | (2006.01) |
| ***G08B 6/00*** | (2006.01) |
| ***B06B 1/02*** | (2006.01) |
| ***B06B 1/04*** | (2006.01) |

(52) U.S. Cl.

CPC ................ *G08B 6/00* (2013.01); *B06B 1/0215* (2013.01); *B06B 1/045* (2013.01); *B06B 2201/70* (2013.01)

(58) Field of Classification Search

CPC ...... G01B 21/16; G01C 5/06; G01C 19/5649; G01P 15/00; G01S 5/02; H04L 67/12; H04L 67/18; H04W 4/008; H04W 4/026; H04W 4/027; H02P 6/008; H02P 6/16; H02P 6/06; H03K 7/08; G06F 17/5063

USPC ......... 340/407.1, 462, 407.2, 815.48, 815.64, 340/815.86, 815.87, 404.2, 566

See application file for complete search history.

(56) References Cited

U.S. PATENT DOCUMENTS

| | | | | |
|---|---|---|---|---|
| 4,881,401 | A * | 11/1989 | Cockerham | 73/35.03 |
| 5,359,268 | A * | 10/1994 | Kashiyama | 318/116 |
| 5,381,492 | A * | 1/1995 | Dooley et al. | 385/12 |
| 5,386,372 | A * | 1/1995 | Kobayashi et al. | 700/280 |
| 5,410,605 | A * | 4/1995 | Sawada et al. | 381/71.14 |
| 7,154,238 | B2 * | 12/2006 | Kinukawa et al. | 318/400.05 |
| 7,630,616 | B2 | 12/2009 | Okubo | |
| 7,733,045 | B2 | 6/2010 | Goto et al. | |
| 7,969,108 | B2 | 6/2011 | Vermeir | |
| 2006/0109201 | A1 | 5/2006 | Ryoo et al. | |
| 2008/0297095 | A1 | 12/2008 | Aono et al. | |
| 2009/0129936 | A1 * | 5/2009 | Yokoyama et al. | 417/16 |
| 2010/0124884 | A1 * | 5/2010 | Moore | 455/41.2 |
| 2011/0248817 | A1 | 10/2011 | Houston et al. | |

FOREIGN PATENT DOCUMENTS

| | | |
|---|---|---|
| JP | 3374577 | 11/2002 |
| JP | 2003153558 | 5/2003 |
| JP | 100851056 | 8/2008 |
| JP | 2001045791 | 2/2011 |
| KR | 2010093916 | 8/2010 |

* cited by examiner

*Primary Examiner* — Daniel Previl
(74) *Attorney, Agent, or Firm* — Volentine & Whitt, PLLC

(57) ABSTRACT

A system and method that generate a vibration motor driving signal includes; a first control unit that receives a first input signal and gain-adjusts the first input signal in response to a reference voltage to generate a first output signal, and a second control unit that receives the first output signal and gain-adjusts the first output signal in response to the reference voltage to generate a second output signal, wherein the second output signal is applied to a vibration motor as the vibration control signal.

23 Claims, 13 Drawing Sheets

3000

4000

SYSTEM AND METHOD GENERATING MOTOR DRIVING SIGNAL AND METHOD CONTROLLING VIBRATION

CROSS-REFERENCE TO RELATED APPLICATIONS

This application claims priority from Korean Patent Application No. 10-2012-0076211 filed on Jul. 12, 2012, the subject matter of which is hereby incorporated by reference.

BACKGROUND

The inventive concept to systems and methods generating a motor driving signal in electronic devices. The inventive concept also relates to methods of controlling the operation of vibration inducing elements in electronic devices.

Many contemporary electronic devices, such as mobile handheld devices, incorporate a vibration inducing element, such as a vibration motor. The mechanical vibration induced by the vibration motor through a handheld device is a convenient signaling technique and may be used in circumstances where audio signaling is undesirable. However, vibration motors consume power, and power is often a relatively scarce commodity in battery-powered, portable electronic devices.

SUMMARY

Recognizing the importance of power management in battery-powered electronic devices, embodiments of the inventive concept better optimize a vibration motor driving signal. A better optimized vibration motor driving signal reduces overall power consumption during operation of the vibration motor, and thereby conserves battery power.

Embodiments of the inventive concept may be implemented as methods and systems providing an optimized vibration motor driving signal, as well as electronic devices incorporating a vibration motor. Electronic devices consistent with certain embodiments of the inventive concept are able to generate a vibration signal (e.g., a signal inducing vibrating mechanical impulses) at a defined level set by a user without unnecessary consumption of power.

Additional advantages, subjects, and features of the inventive concept will be set forth by way of exemplary embodiment in the description that follows.

In one aspect, the inventive concept provides a system generating a vibration motor driving signal, the system comprising; a first control unit that receives a first input signal and gain-adjusts the first input signal in response to a reference voltage to generate a first output signal, and a second control unit that receives the first output signal and gain-adjusts the first output signal in response to the reference voltage to generate a second output signal, wherein the second output signal is applied to a vibration motor as the vibration control signal.

In another aspect, the inventive concept provides a method of generating a vibration motor driving signal, comprising; gain-adjusting a first input signal in response to a reference voltage to generate a first output signal, gain-adjusting the first output signal in response to the reference voltage to generate a second output signal, and applying the second output signal to a vibration motor as the vibration control signal.

In another aspect, the inventive concept provides a semiconductor device comprising; a digital pattern signal generation block that provides a digital pattern signal, a digital-to-analog converter (DAC) that converts the digital pattern signal into a corresponding analog pattern signal, and a system generating a vibration motor driving signal. The system comprises; a first control unit that receives the analog pattern signal and gain-adjusts the analog pattern signal in response to a reference voltage to generate a first output signal, and a second control unit that receives the first output signal and gain-adjusts the first output signal in response to the reference voltage to generate a second output signal, wherein the second output signal is applied to a vibration motor as the vibration control signal.

In another aspect, the inventive concept provides an electronic device having a vibration motor, and comprising; an interface unit that receives a user-defined control signal defining vibration intensity produced by the vibration motor, and a system generating a vibration motor driving signal. The system comprising; a first control unit that receives a first input signal and gain-adjusts the first input signal in response to a reference voltage to generate a first output signal, and a second control unit that receives the first output signal and gain-adjusts the first output signal in response to the reference voltage to generate a second output signal, wherein the second output signal is applied to the vibration motor as the vibration control signal.

BRIEF DESCRIPTION OF THE DRAWINGS

Certain embodiments of the inventive concept will be described in relation to the accompanying drawings, in which.

DETAILED DESCRIPTION

Figure 1:
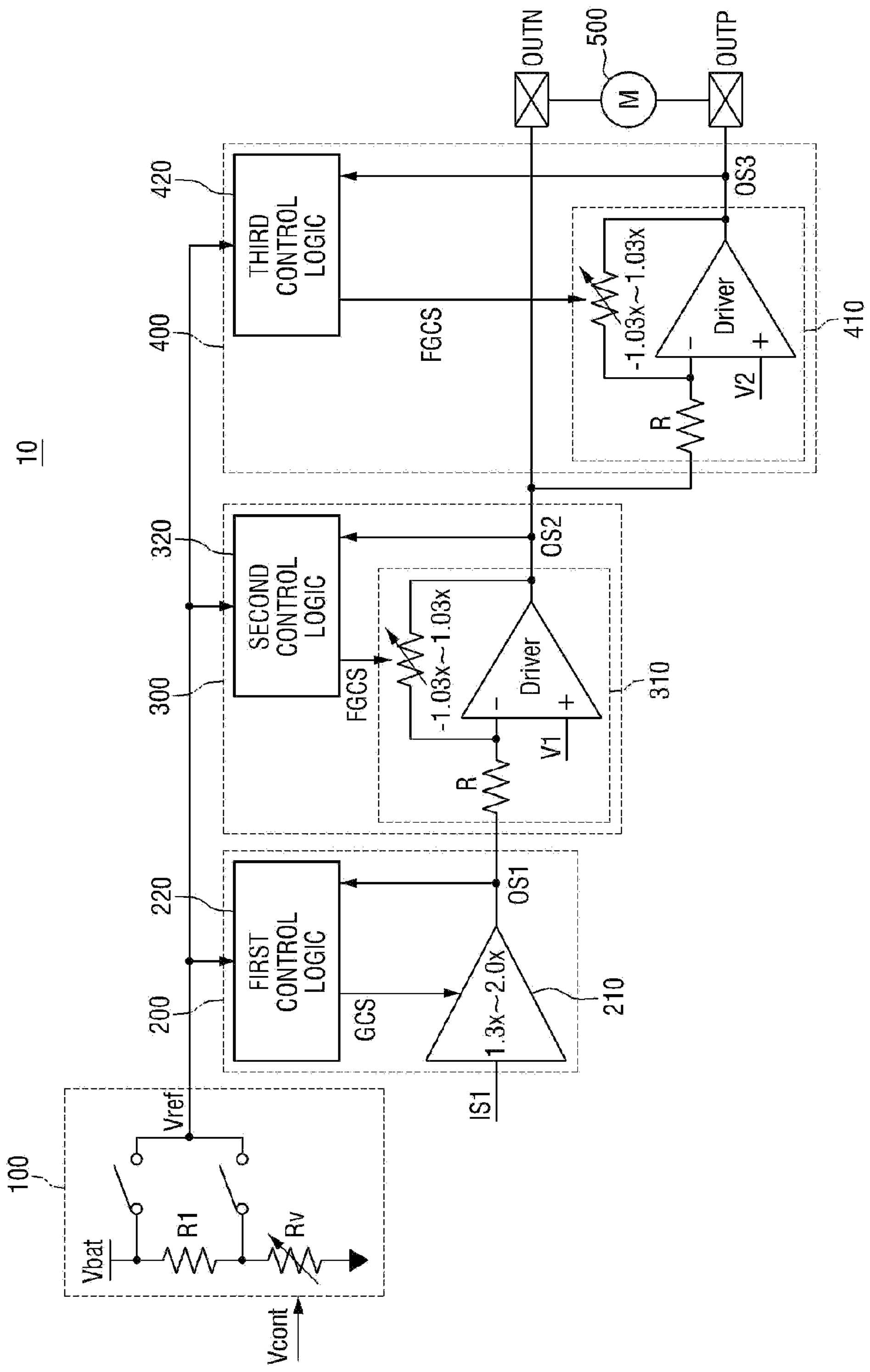
FIG. 1 is a system circuit diagram illustrating an embodiment of the inventive concept.

Advantages and features of the inventive concept may be more readily appreciated upon consideration of the following detailed description of embodiments and the accompanying drawings. The inventive concept may be embodied in many different forms and should not be construed as being limited to only the illustrated embodiments. Rather, the illustrated embodiments are provided so that this disclosure will be thorough and complete and will fully convey the concept of the inventive concept to those skilled in the art. The scope of the inventive concept is defined by the appended claims.

Throughout the written description and drawings, like reference numbers and labels are used to denote like or similar elements and features.

It will be understood that when an element or layer is referred to as being "on" or "connected to" another element or layer, it can be directly on or connected to the other element or layer or intervening elements or layers. In contrast, when an element is referred to as being "directly on" or "directly connected to" another element or layer, there will be no intervening elements or layers. As used herein, the term "and/or" includes any and all combinations of one or more of the associated listed items.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

FIG. 1 is a circuit diagram illustrating in relevant portion a system 10 capable of generating a vibration motor driving signal according to an embodiment of the inventive concept.

Referring to FIG. 1, the system 10 comprises a voltage divider 100, a first control unit 200, a second control unit 300, and a third control unit 400.

The voltage divider 100 may be used to generate a reference voltage Vref by dividing a supply voltage Vbat (e.g., a DC voltage provided by a battery) according to a set of defined resistance settings. For example, as shown in FIG. 1 the series-combination of a variable resistor $R_v$ and a fixed resistor R1 connected between the supply voltage Vbat and ground may be used to implement the voltage divided 100.

With this configuration, an externally provided, vibration control signal Vcont (e.g., a user controlled vibration intensity-setting signal) may be used to adjust the resistance of the variable resistor Rv, such that a relatively high level reference voltage Vref results in a strong vibration intensity being generated by a vibration motor 500, while a relatively low level reference voltage Vref results in a weak vibration intensity being generated by the vibration motor 500. Alternately, it is possible that a relatively high level reference voltage Vref results in a weak vibration intensity being generated by the vibration motor 500, while a relatively high level reference voltage Vref results in a strong vibration intensity being generated by the vibration motor 500.

Those skilled in the art will recognize that may different implementations of voltage divider 100 may be used in other embodiments of the inventive concept, and will further recognize that the vibration control signal may be variously defined. In certain embodiments, the voltage divider 100 may be configured separately from the system 10.

Returning to FIG. 1, the first control unit 200 may be used to initialize a received first input signal IS1, such that the level of the first input signal IS1 is adjusted to a defined first level higher than the reference voltage Vref, and subsequently provided as a first output signal OS1. In the illustrated embodiment, the first input signal IS1 applied to the first control unit 200 is assumed to be an analog signal, but a digital signal equivalent may alternately be used. In certain embodiments, the first input signal IS1 applied to the first control unit 200 may be an analog signal having a signal waveform appropriate to the driving of the motor 500. However, embodiments of the inventive concept are not limited thereto, and such a configuration may be modified in various ways, as needed.

Figure 2:
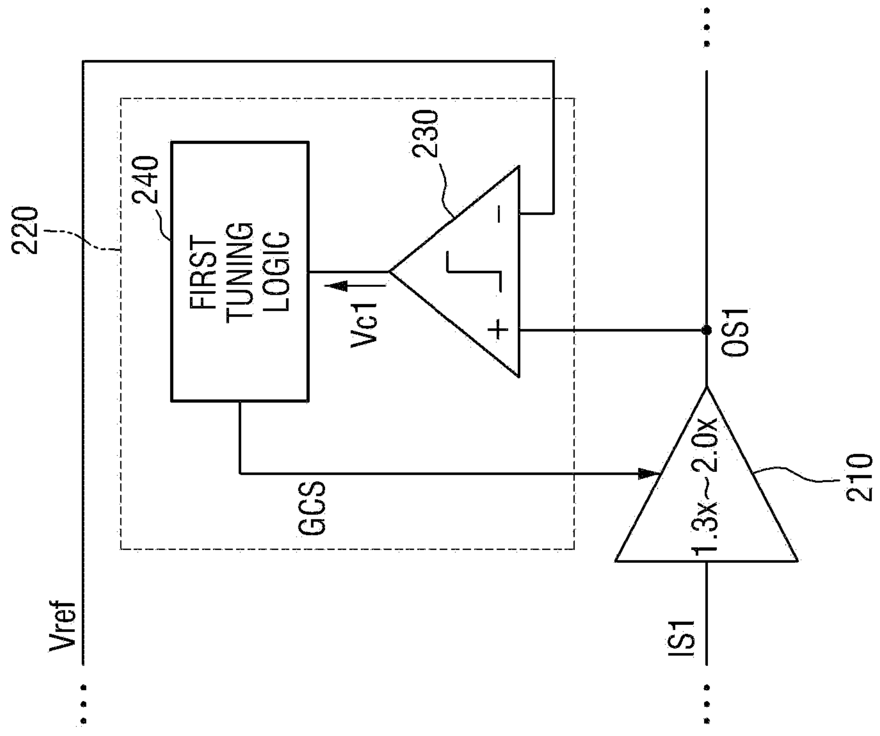
FIG. 2 is a circuit diagram further illustrating the first control logic of FIG. 1.

Accordingly, as illustrated in FIG. 2, the first control logic 220 may comprise a first control unit 200 including a first gain adjustment unit 210 and first control logic 220. Assuming this configuration for first control logic 220, the first gain adjustment unit 210 receives the first input signal IS1, and in response to a gain control signal GCS provided by the first control logic 220, applies a gain (up or down) to generate the first out signal OS1. Here, the gain control signal GCS may be a digital control signal having N bits, where "N" is a natural number. In certain exemplary embodiments described hereafter, N is assumed to be 3, but those skilled in the art will understand that any reasonable number of control signal bits may alternately be used, or that the gain control signal GCS may be analog in nature.

The first control logic 220 may generate the gain control signal GCS by comparing the level of the first output signal OS1 with the reference voltage Vref using a first comparator 230 that provides a resulting comparison signal $V_{C1}$ to first tuning logic 240. In certain embodiments the comparison signal $V_{C1}$ may have a triggered pulse waveform, wherein a pulse signal (PS) is generated when the level of the first output signal OS1 is higher than the reference voltage Vref, but a fixed level signal (DC) is generated when the level of the first output signal OS1 is lower than the reference voltage Vref. The first tuning logic 240 then generates the gain control signal GCS in response to the comparison signal $V_{C1}$.

For example, assuming the use of a PS/DC comparison signal $V_{C1}$ described above, the first tuning logic 240 may apply different gain control signals GCS to the first gain adjustment unit 210. That is, while the fixed level signal (DC) is received from the first comparator 230, the first tuning logic 240 will provide a first gain control signal GCS1 to the first gain adjustment unit 210, and while the pulse signal (PS) is received from the first comparator 230, the first tuning logic 240 will provide a second gain control signal GCS2 different from the first gain control signal GCS1. The first and second gain control signals GCS1 and GCS2 may be applied to the first gain adjustment unit 210 as continuous gain control signals, or as pulse stepped control signals.

In one particular embodiment of the inventive concept, it is assumed that the first gain adjustment unit 210 is capable of adjusting the level of the first input signal IS1 according to stepped increments of 0.1X between a range of 1.3X to 2.0X, where "X" is the level of first input signal IS1. In certain embodiments of the inventive concept, the first gain adjustment unit 210 may be implemented as a gain resistor having an analog input and an analog output separated by a variable resistance controlled by the digital gain control signal GCS.

It should be further noted at this point that one or more of the components used to implement the first control unit 200 (e.g., the first gain adjustment unit 210 and the first control logic 220) may be implemented, wholly or partially, in software and/or firmware.

Figure 3:
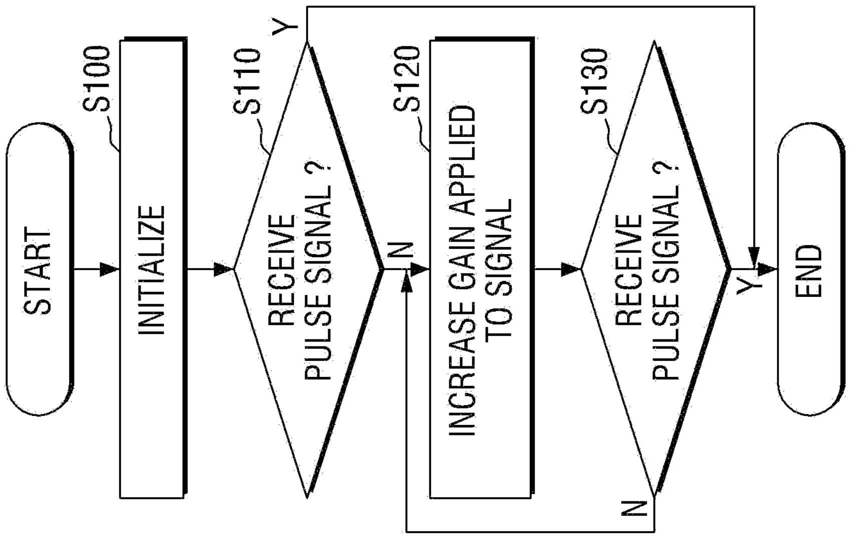
FIG. 3 is a flowchart summarizing a method of operating the first control logic of FIG. 2.
Figure 4:
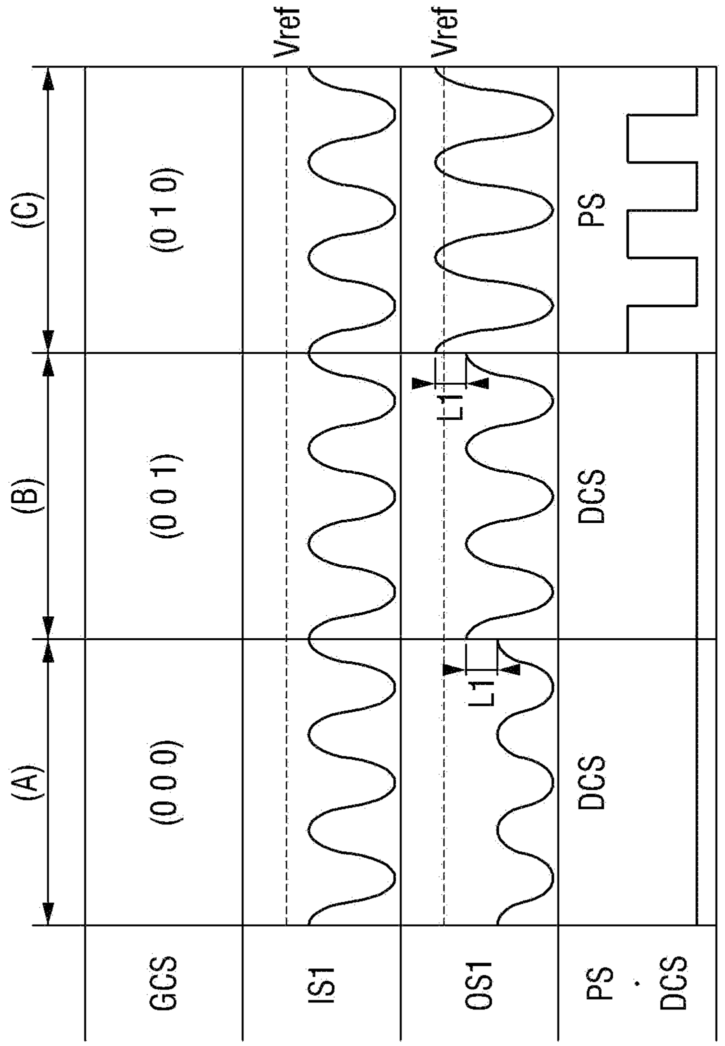
FIG. 4 is a related timing diagram for certain signals that may be used to control the method.

FIG. 3 is a flowchart summarizing one possible operating method for the first control logic 220 of FIG. 2, and FIG. 4 is a related timing diagram.

Referring to FIG. 3, the level of the first output signal OS1 is initialized (S100). For example, the first tuning logic 240 may initially apply a threshold gain control signal GCS0 (e.g., 000) to the first gain adjustment unit 210. In response to the application of the threshold gain control signal, the first gain adjustment unit 210 may apply a minimal gain to the first input signal IS1. Assuming a nominal gain range for the first gain adjustment unit 210 extending between 1.3X to 2.0X, the threshold gain control signal GCS0 would establish a level for the first output signal OS1 equal to 1.3 times the level of the first input signal IS1.

Next, the first tuning logic 240 provides a first gain control signal GCS1 that increases (incrementally or continuously) the gain applied to the first input signal IS1, so long as the first comparator outputs the DC signal (DCS). However, the first tuning logic 240 determines that the comparison signal $V_{C1}$ has transitioned from the DC signal (DCS) to the pulse signal (PS) (S110), the first tuning logic 240 then provides a second gain control signal GCS2 that does not cause an increase (or alternately may cause a decrease) in the gain applied to the first input signal IS1. Thus, if the pulse signal (PS) is not output (S110=No) as the comparison signal $V_{C1}$ as the result of the comparison between the first output signal OS1 and the reference voltage Vref, the gain applied to the level of the first input signal IS1 will be increased (S120), until the pulse signal (PS) is received (S130). Otherwise, so long as the pulse signal (PS) is not received (S110=Yes), the gain of the first output signal OS1 will be increased.

Referring to FIG. 4, during a first control period (A), the first output signal OS1 is assumed to be at the minimal level established in response to the threshold gain control signal (000). In the absence of a pulse signal (PS) provided by the first comparator 230 during the first control period (A) and a second control period (B), additional gain is applied by the first tuning logic 240 to the first input signal IS1, thereby increasing the level (e.g., the illustrated step increase "L1") of the first output signal OS1.

However, during a third control period (C), when the first comparator 230 outputs the pulse signal (PS) in response to the level of the first output signal OS1 becoming higher than the reference voltage Vref. Upon detecting transition of the comparison signal $V_{C1}$ from the DC signal (DCS) to the pulse signal (PS), the first tuning logic 240 stops increasing the gain applied to the level of the first input signal IS1. In other words, the first tuning logic 240 stops providing the first gain control signal and begins providing the second gain control signal.

The foregoing example has been simplified to maximize clarity of explanation. Only a single (static) increment is used to increase the gain applied to the first input signal IS1. In other embodiments of the inventive concept, multiple comparison thresholds may be used to select different (graduated) gain increments to better fine tune the first output signal OS1.

The first tuning logic 240 may be variously implemented. One possible embodiment is operatively illustrated in FIG. 5, FIG. 6, and FIG. 7 according to an embodiment of the inventive concept.

Figure 5:
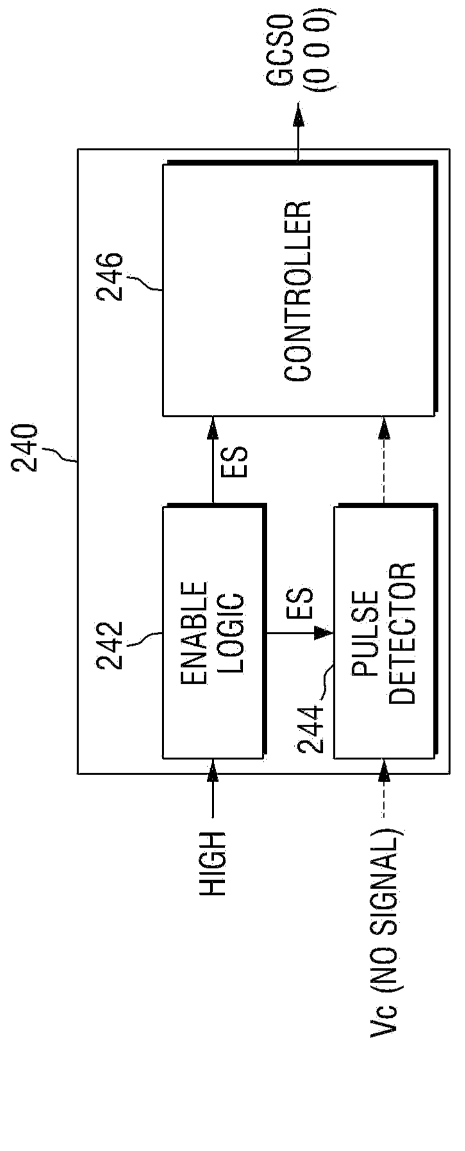
FIG. 5, FIG. 6 and FIG. 7 are respective block diagrams illustrating one possible example of the first tuning logic 240 shown in FIG. 2 according to an embodiment of the inventive concept.

Referring first to FIG. 5, conditions for system 10 during the first control period (A) of FIG. 4 are illustrated. The first tuning logic 240 is assumed to comprise enable logic 242, a pulse detector 244, and a controller 246. The enable logic 242 provides an enable signal ES to both the pulse detector 244 and controller 246 so long as an externally provided signal is (e.g.,) logically "high". However, in the absence of a coherent comparison signal $V_{C1}$ during an initialization period (NO SIGNAL), the pulse detector does not provide a detection signal to the controller 246 and the threshold gain control signal GCS0 (000) is output.

Figure 6:
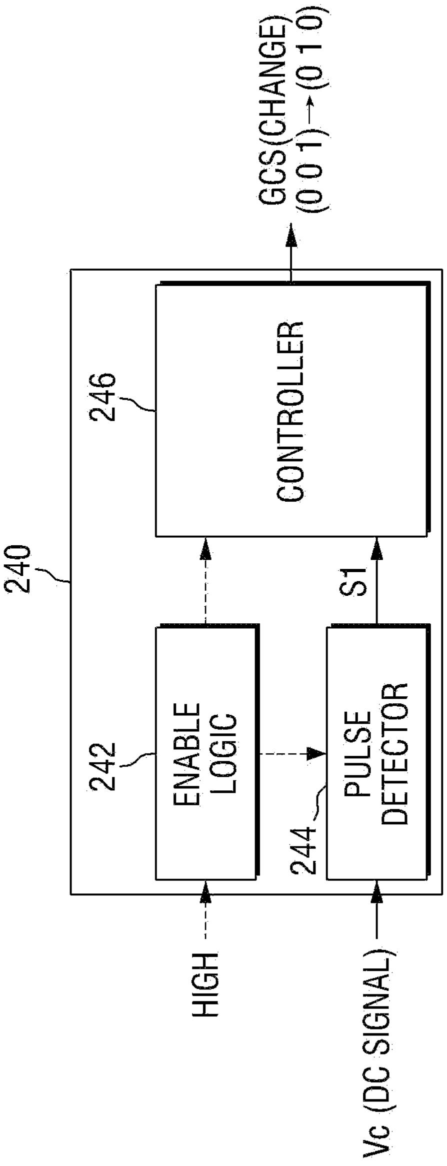

FIG. 6 similarly illustrates conditions for system 10 during the second control period (B) of FIG. 4. In response to the enable signal ES, the pulse detector 244 provides a first detection signal S1 to the controller 246 when the DC signal (DCS) is provided by the first comparator 230 indicating that the first output signal OS1 is not higher than the reference voltage Vref. The first detection signal S1 causes the controller 246 to increase (e.g., step-wise increment) the gain applied to the first input signal IS1.

Figure 7:
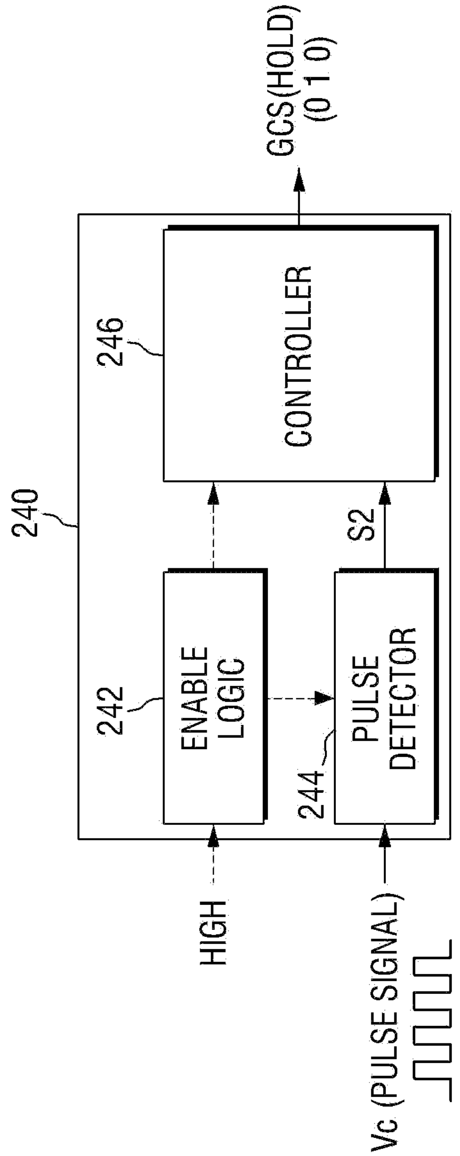

FIG. 7 illustrates conditions for system 10 during the third control period (B) of FIG. 4. In response to the enable signal ES, the pulse detector 244 provides a second detection signal S2 to the controller 246 when the pulse signal (PS) is provided by the first comparator 230 indicating that the first output signal OS1 is higher than the reference voltage Vref. The second detection signal S2 causes the controller 246 to "hold" a current gain being applied to the first input signal IS1.

Referring back to FIG. 1, the second control unit 300 is configured to receive and initialize the first output signal OS1 provided by the first control unit 200, and is further configured to adjust the level of the first output signal OS1 in order to generate a second output signal OS2 having a level that is closer to the actual level of the reference voltage Vref than the first output signal OS1, wherein the second output signal OS2 may be applied to a first terminal OUTN of the motor 500 as a first driving signal.

As shown in FIG. 1, the second control unit 300 may include a second gain adjustment unit 310 and second control logic 320.

Figure 8:
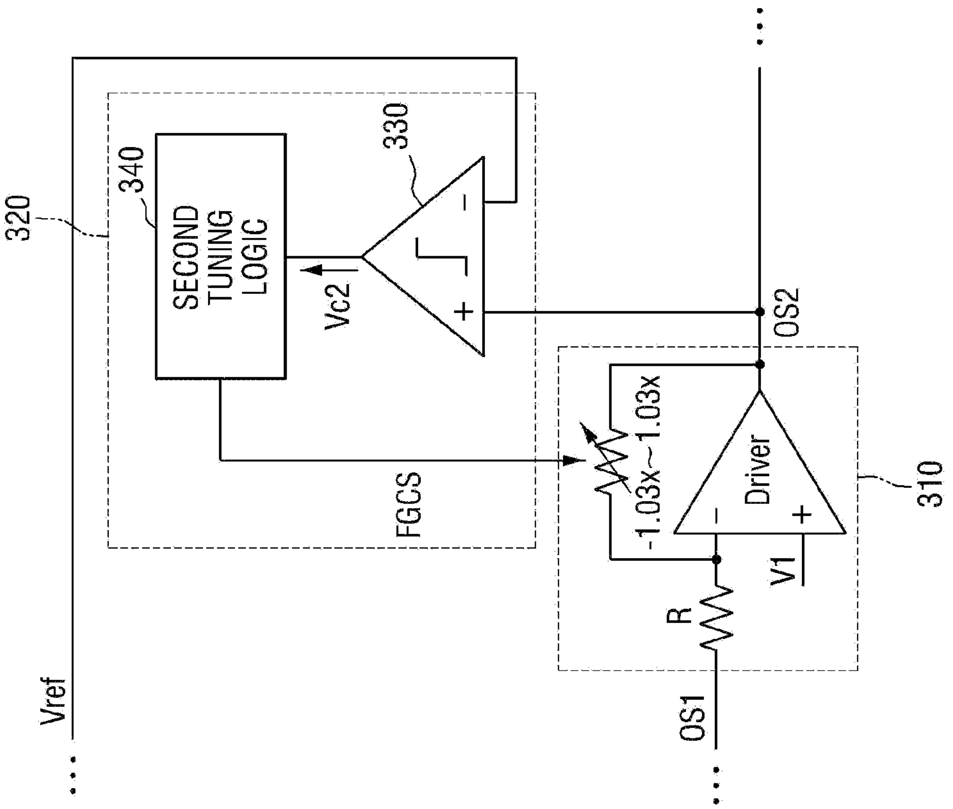
FIG. 8 is a circuit diagram illustrating a second control logic that may be used in the second control logic of FIG. 1 according to an embodiment of the inventive concept.

As further illustrated in FIG. 8, the second control logic 320 receives the second output signal OS2 and compares the level of the second output signal OS2 with the level of the reference voltage Vref using a second comparator 330 to generate a resulting second comparison signal $V_{C2}$ Like the first comparison signal VC1, the second comparison signal VC2 may be used to control the output of second tuning logic 340 that generates a fine gain control signal fGCS. In certain embodiments, the fine gain control signal fGCS may be a digital control signal having M bits, where "M" is a natural number. Further, in certain embodiments, the fine gain control signal fGCS provided by the second control logic 320 may be applied to a variable feedback resistor control signal for the second gain adjustment unit 310.

The second gain adjustment unit 310 may be used to further adjust the level of the first output signal OS1 according to a second gain factor in order to generate a second output signal OS2. Hereinafter, for convenience in explanation, it is assumed that the fine gain control signal fGCS provided by the second tuning logic 340 also comprises 3 bits like the gain control signal GCS provided by the first tuning logic 240. However, the second gain adjustment unit 310 has a decidedly narrower gain range, as compared with the first gain adjustment unit 210. For example, the second gain adjustment unit 310 may have a gain range extending from −1.03X to +1.03X, where "X" is now the level of the first output signal OS1. Thus, continuing with the working assumptions, the second control unit 300 according to one particular embodiment of the inventive concept is able to more finely adjust the level of a vibration motor driving signal in relation to the first control unit 200 by an order of magnitude.

Otherwise, the second control unit 300 and its constituent components (310, 320, 330 and 340) illustrated in FIGS. 1 and 8 may be understood as being respectively analogous to the first control unit 200 and its constituent components (210, 220, 230 and 240) illustrated in FIGS. 1 through 7. In the context of the illustrated examples, the first control unit 200 is assumed to apply a gain selected from a range of positive gain (e.g., +1.3X to +2.0X), while the second control unit 300 is assumed to apply a gain selected from range of negative, neutral and positive gain (e.g., −1.03 to +1.03). However, this need not always be the case, and those skilled in the art will understand that any reasonable gain ranges may be chosen to fit the needs of a particular vibration motor design and control scheme.

Figure 9:
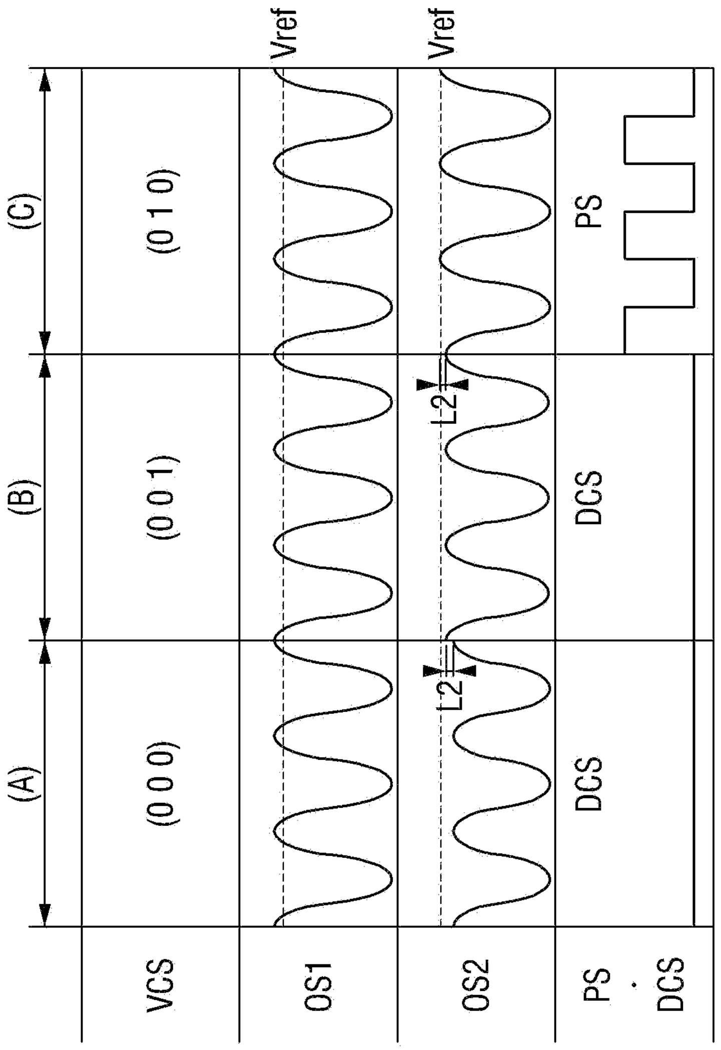
FIG. 9 is a control signal timing diagram for the second control unit according to an embodiment of the inventive concept.

FIG. 9 is a control signal timing diagram that is analogous to the control signal timing diagram of FIG. 4. Here again, three control periods (A), (B) and (C) are illustrated in relation to operation of the second control logic 320 according to an embodiment of the inventive concept.

Referring to FIG. 9, the second tuning logic 340 may initially provide "zero" gain to the level of the first output signal OS1 in response to an initial fine gain control signal fGCS condition (e.g., "000"). In the illustrated embodiment of FIG. 9, it is assumed that the initial level the first output signal OS1 received by the second gain adjustment unit 310 is less than the reference voltage Vref. Accordingly, additional positive gain (e.g., L2) is applied to the level of the first output signal OS1 through control periods (A) and (B) until the level of the first output signal OS1 is equal to the reference voltage Vref in control period (C). The gain adjusted first output signal OS1 is then output by the second control unit 300 as a second output signal OS2 and applied to a first (negative) terminal OUTN of the motor 500.

In effect, the first control unit 200 may be understood as a coarse signal level adjusting unit, while the second control unit 300 may be understood as a sequentially applied, fine signal level adjusting unit. Embodiments of the inventive concept having this configuration are better able to adjusted a vibration control signal in relation to a given reference voltage Vref.

Referring again to FIG. 1, the third control unit 400 similarly receives and may initialize the second output signal OS2, and may then adjust the level of the second output signal OS2 in a manner analogous to that of the second control unit 300 in order to generate a third output signal OS3. The configuration and the operation of the third control unit 400 may thus be understood from the foregoing description.

It should further be noted that in the illustrated embodiment of FIG. 1, the second and third gain adjustment units 310 and 410 include a differential driver (amplifier) having a controlled feedback variable-resistor configuration. One terminal (e.g., a negative terminal) of each differential driver in the second and third gain adjustment units 310 and 410 receives the (first or second) output signal being gain adjusted, while the another terminal (e.g., a positive terminal) receives a (first or second) control voltage $V_1$ and $V_2$.

As described above, the system 10 does not generate a vibration motor driving signal that is markedly different (e.g., neither substantially higher than nor substantially lower than) a given reference voltage. This is exemplary of the inventive concept that provides better optimized vibration motor control signals.

Those skilled in the art understand that individual semiconductor components forming a control signal circuit and system will necessarily vary in their characteristics due to fluctuations in the fabrication processes and conditions used to manufacture same. However, systems and methods consistent with embodiments of the inventive concept are not materially influenced by such variations, but instead may accurately define and provide a vibration motor control signal in spite of these variations.

Figure 10:
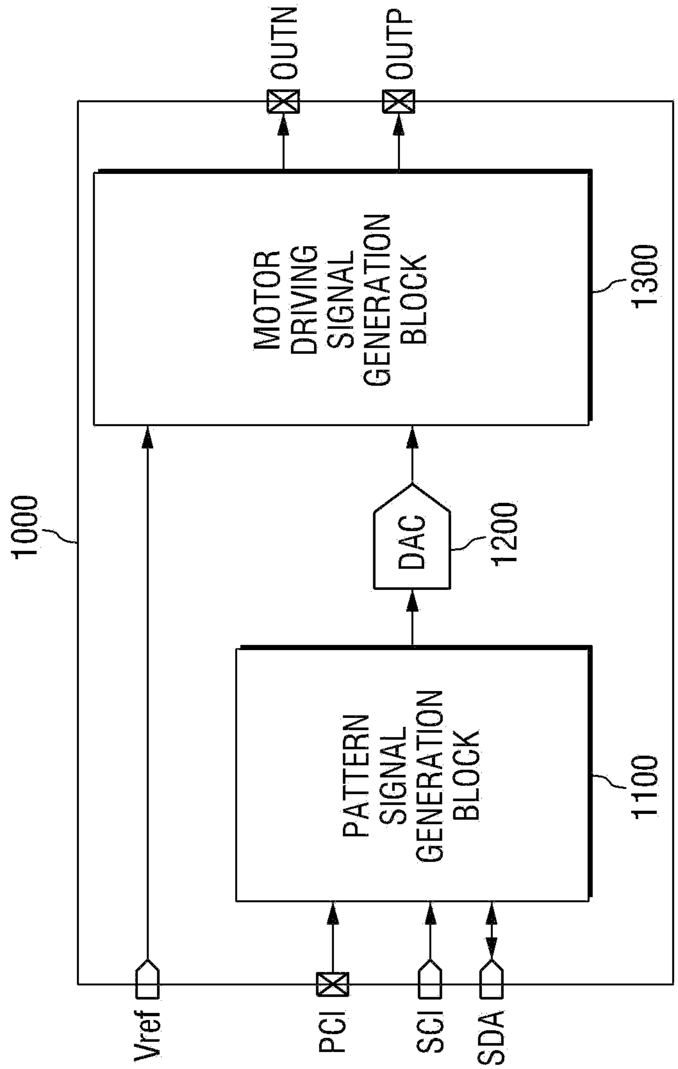
FIG. 10 is a block diagram of a semiconductor device according to an embodiment of the inventive concept.

FIG. 10 is a block diagram of a semiconductor device 1000 according to an embodiment of the inventive concept.

Referring to FIG. 10, the semiconductor device 1000 comprises a pattern signal generating block 1100, a digital-to analog converter (DAC) 1200, and a motor driving signal generation block 1300.

The pattern signal generation block 1100 generates a digital pattern signal from received input signals PCI and/or SCI. The DAC 1200 then converts the digital pattern signal into a corresponding analog pattern signal. The analog pattern signal is then provided to the motor driving signal generation block 300 as a first input signal IS1. (See above). The motor driving signal generation block 1300 may generate a vibration motor driving signal by adjusting the level of the analog pattern signal provided from DAC 1200.

In certain embodiments of the inventive concept, the semiconductor device 1000 may be configured as a haptic motor driver.

Figure 11:
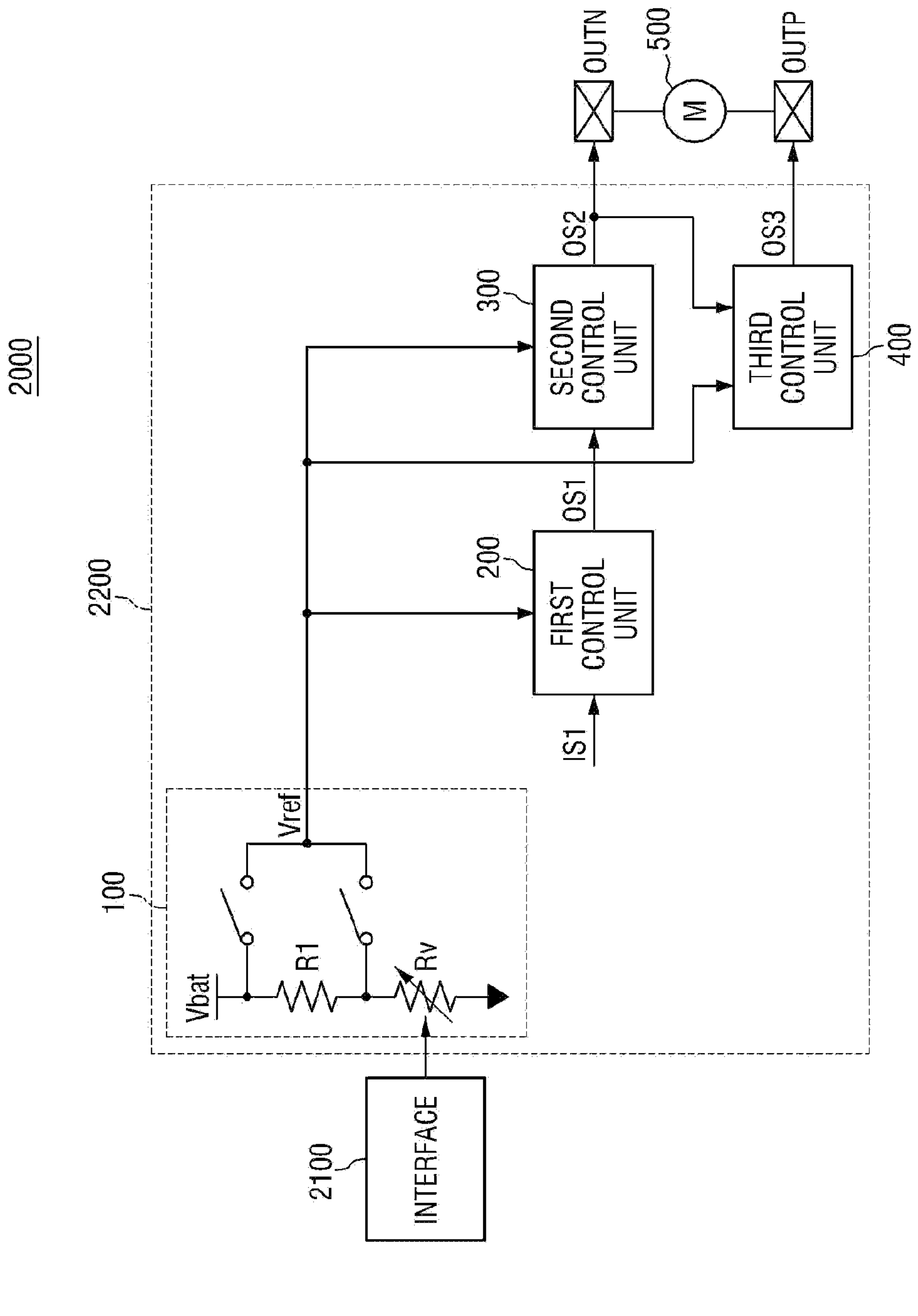
FIG. 11 is a block diagram of an electronic device according to an embodiment of the inventive concept.
Figure 12:
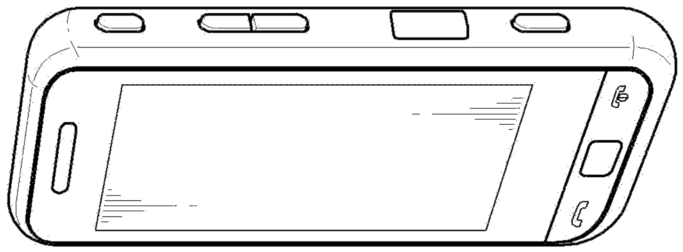
FIG. 12 and FIG. 13 are exemplary views of an electronic device according to an embodiment of the inventive concept.
Figure 13:
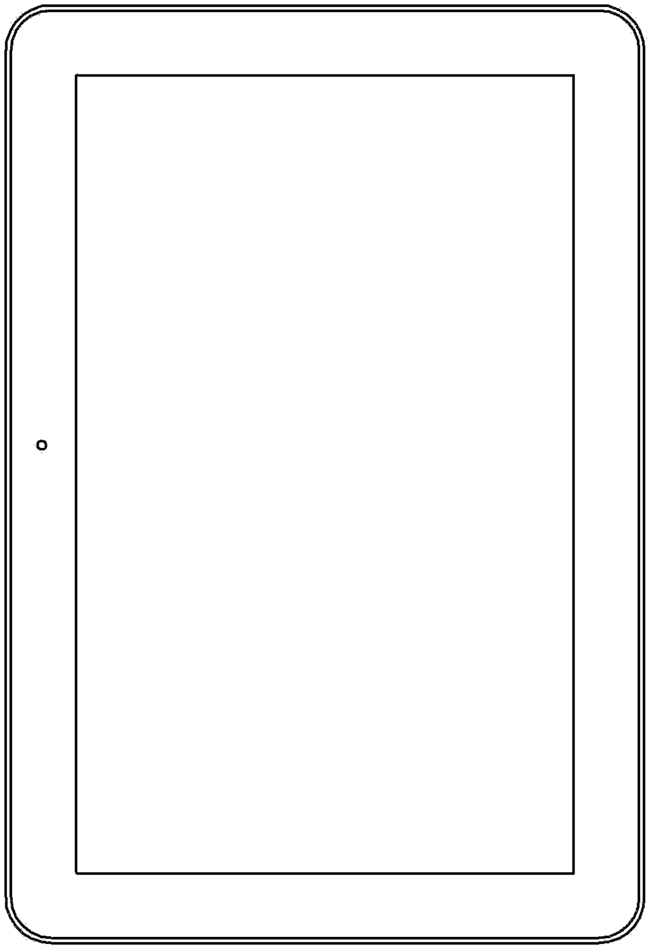

FIG. 11 is a block diagram of an electronic device according to an embodiment of the inventive concept. FIGS. 12 and 13 are exemplary views of an electronic device according to an embodiment of the inventive concept.

Referring to FIG. 11, an electronic device 2000 comprises an interface unit 2100, a system generating a vibration motor driving signal 2200, and a motor 500.

The interface unit 2100 may be used to receive a user-defined setting for vibration strength. This setting may be used to adjust the variable resistor $R_v$ of the voltage divider 100 in its generation of a reference voltage Vref.

The system for generating the vibration motor driving signal 2200 may be configured and operated in response to the reference voltage Vref as described above. With this configuration, the electronic device may include a vibration capability driven by an optimized vibration motor driving signal that does not consume unnecessary power.

One example of an electronic device capable of incorporating an embodiment of the inventive concept is the smart phone 3000 illustrated in FIG. 12. The smart phone 3000 may include the interface unit 2100 as (e.g.,) a touch screen. That is, a user may set the vibration intensity for the smart phone 3000 via the touch screen of the smart phone 3000, such that the smart phone 3000 will vibrate with the vibration strength set by the user.

Another example of the electronic device capable of incorporating an embodiment of the inventive concept is the tablet PC 4000 illustrated in FIG. 13. Here again, the tablet PC 4000 may implement the interface unit 2100 as part of touch screen functionality. Thus, the user may set the vibration strength of the tablet PC 4000 via the touch screen of the tablet PC 4000, and the tablet PC 4000 may vibrate with the vibration strength set by the user.

Many different electronic devices may incorporate an embodiment of the inventive concept, such as a computer, an UMPC (Ultra Mobile PC), a workstation, a net-book, a PDA (Personal Digital Assistants), a portable computer, a wireless phone, a mobile phone, an e-book, a PMP (Portable Digital Assistants), a portable game machine, a navigation device, a black box, a digital camera, a 3-dimensional television, a digital audio recorder, a digital audio player, a digital picture recorder, a digital picture player, a digital video recorder, a digital video player, or the like.

Although certain embodiments of the inventive concept have been described for illustrative purposes, those skilled in the art will appreciate that various modifications, additions and substitutions are possible, without departing from the scope of the inventive concept as set forth by the accompanying claims.

What is claimed is:

1. A system generating a vibration motor driving signal, the system comprising:

a first control unit that receives a first input signal, and gain-adjusts the first input signal in response to a reference voltage to generate a first output signal; and a second control unit that receives the first output signal, and gain-adjusts the first output signal in response to the reference voltage to generate a second output signal, wherein the second output signal is applied to a vibration motor as the vibration control signal, wherein the first control unit comprises a first comparator that compares the first output signal and the reference voltage to generate a first comparison signal, first tuning logic that generates a first gain control signal in response to the first comparison signal, and a first gain adjustment unit that gain-adjusts the first input signal in response to the first gain control signal.

2. The system of claim 1, further comprising:

a voltage divider dividing a supply voltage in response to a user-defined control signal to generate the reference voltage.

3. The system of claim 2, where the voltage divider comprises a variable resistor having a resistance value defined by the user-defined control signal.

4. The system of claim 2, wherein the first input signal is incrementally gain-adjusted using a first increment size, and the first output signal is incrementally gain-adjusted using a second increment size smaller than the first increment size.

5. The system of claim 1, wherein the first comparison signal is a fixed signal when the first output signal is less than the reference voltage, and a pulse signal when the first output signal is not less than the reference voltage.

6. The system of claim 5, wherein the second control unit comprises:

a second comparator that compares the second output signal and the reference voltage to generate a second comparison signal;

second tuning logic that generates a second gain control signal in response to the second comparison signal; and a second gain adjustment unit that gain-adjusts the first output signal in response to the second gain control signal.

7. The system of claim 6, wherein the second comparison signal is a second fixed signal when the second output signal is less than the reference voltage, and a second pulse signal when the second output signal is not less than the reference voltage.

8. The system of claim 7, wherein the first gain control signal is a coarse gain control signal, and the second gain control signal is a fine gain control signal.

9. The system of claim 7, wherein the second tuning logic comprises:

enable logic providing an enable signal;

a pulse detector that receives the second comparison signal and the enable signal, generates a first signal in response to the second fixed signal, and generates a second signal in response to the second pulse signal; and a controller that generates the second gain control signal in response to one of the first and second signals and the enable signal.

10. The system of claim 6, wherein the first gain adjustment unit gain-adjusts the first input signal across a first gain range including only positive gain values.

11. The system of claim 10, wherein the second gain adjustment unit gain-adjusts the first output signal across a second gain range including negative and positive gain values.

12. The system of claim 10, wherein the first gain range is at least ten times that of the second gain range.

13. The system of claim 5, wherein the first tuning logic comprises:

enable logic providing an enable signal;

a pulse detector that receives the first comparison signal, generates a first signal in response to the fixed signal, and generates a second signal in response to the pulse signal; and a controller that generates the first gain control signal in response to the first and second signals.

14. A method of generating a vibration motor driving signal, comprising:

gain-adjusting a first input signal in response to a reference voltage to generate a first output signal;

gain-adjusting the first output signal in response to the reference voltage to generate a second output signal; and applying the second output signal to a vibration motor as the vibration control signal, wherein said gain-adjusting the first input signal comprises comparing the first output signal and the reference voltage to generate a first comparison signal, generating a first gain control signal in response to the first comparison signal, and gain-adjusting the first input signal in response to the first gain control signal.

15. The method of claim 14, further comprising voltage dividing a supply voltage in response to a user-defined control signal to generate the reference voltage.

16. The method of claim 15, wherein the first input signal is incrementally gain-adjusted using a first increment size, and the first output signal is incrementally gain-adjusted using a second increment size smaller than the first increment size.

17. The method of claim 14, wherein said gain-adjusting the first output signal comprises:

comparing the second output signal and the reference voltage to generate a second comparison signal;

generating a second gain control signal in response to the second comparison signal; and gain-adjusting the first output signal in response to the second gain control signal.

18. A semiconductor device comprising:
a digital pattern signal generation block that provides a digital pattern signal;
a digital-to-analog converter (DAC) that converts the digital pattern signal into a corresponding analog pattern signal; and
a system generating a vibration motor driving signal comprising:
a first control unit that receives the analog pattern signal and gain-adjusts the analog pattern signal in response to a reference voltage to generate a first output signal; and
a second control unit that receives the first output signal and gain-adjusts the first output signal in response to the reference voltage to generate a second output signal, wherein the second output signal is applied to a vibration motor as the vibration motor driving signal,
wherein the first control unit comprises
a first comparator that compares the first output signal and the reference voltage to generate a first comparison signal,
first tuning logic that generates a first gain control signal in response to the first comparison signal, and
a first gain adjustment unit that gain-adjusts the analog pattern signal in response to the first gain control signal.

19. The semiconductor device of claim 18, further comprising:
a voltage divider dividing a supply voltage in response to a user-defined control signal to generate the reference voltage.

20. The semiconductor device of claim 19, where the voltage divider comprises a variable resistor having a resistance value defined by the user-defined control signal.

21. The semiconductor device of claim 18, wherein the second control unit comprises:
a second comparator that compares the second output signal and the reference voltage to generate a second comparison signal;
second tuning logic that generates a second gain control signal in response to the second comparison signal; and
a second gain adjustment unit that gain-adjusts the first output signal in response to the second gain control signal.

22. An electronic device having a vibration motor, and comprising:
an interface unit that receives a user-defined control signal defining vibration intensity produced by the vibration motor; and
a system generating a vibration motor driving signal, the system comprising:
a first control unit that receives a first input signal and gain-adjusts the first input signal in response to a reference voltage to generate a first output signal; and
a second control unit that receives the first output signal and gain-adjusts the first output signal in response to the reference voltage to generate a second output signal, wherein the second output signal is applied to the vibration motor as the vibration motor driving signal,
wherein the first control unit comprises
a first comparator that compares the first output signal and the reference voltage to generate a first comparison signal,
first tuning logic that generates a first gain control signal in response to the first comparison signal, and
a first gain adjustment unit that gain-adjusts the first input signal in response to the first gain control signal.

23. The electronic device of claim 22, wherein the second control unit comprises:
a second comparator that compares the second output signal and the reference voltage to generate a second comparison signal;
second tuning logic that generates a second gain control signal in response to the second comparison signal; and
a second gain adjustment unit that gain-adjusts the first output signal in response to the second gain control signal.

* * * * *